Nov. 11, 1952    J. K. DOUGLAS    2,617,257
CONTROL VALVE AND OPERATING MEANS THEREFOR
Filed Dec. 10, 1948    2 SHEETS—SHEET 1
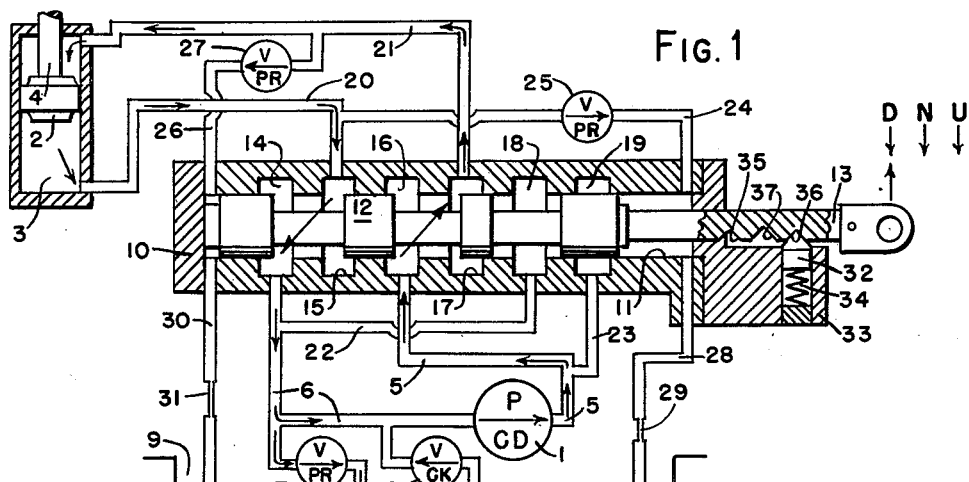
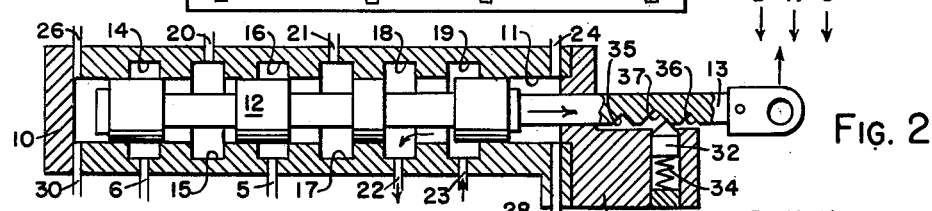
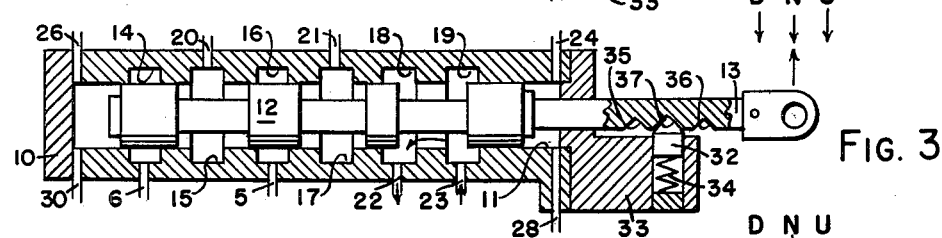
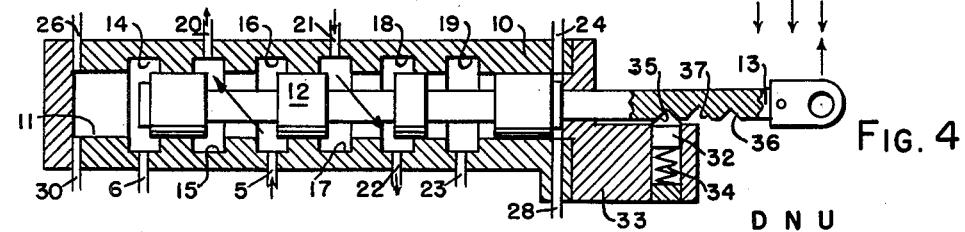
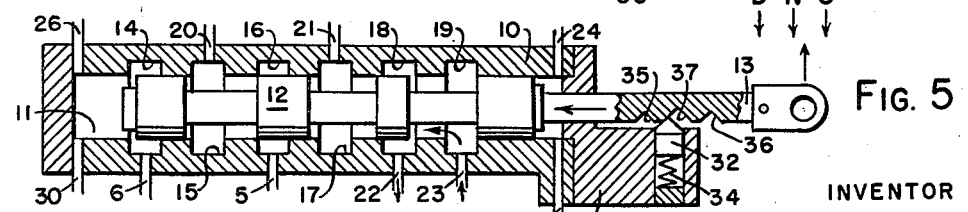
INVENTOR
JAMES K. DOUGLAS
BY Wesley P. Merrill
ATTORNEY INVENTOR
JAMES K. DOUGLAS
BY Wesley P. Merrill
ATTORNEY Patented Nov. 11, 1952

2,617,257

UNITED STATES PATENT OFFICE 2,617,257

CONTROL VALVE AND OPERATING MEANS THEREFOR

James K. Douglas, Shorewood, Wis., assignor to The Oilgear Company, Milwaukee, Wis., a corporation of Wisconsin Application December 10, 1948, Serial No. 64,571

14 Claims. (Cl. 60—52)

This invention relates to valves for controlling the flow of fluid to and from fluid motors and other fluid operated devices. A valve embodying the invention is particularly adapted to control a hydraulic motor which operates earth moving machinery or other apparatus carried or moved by a tractor or other automotive vehicle and the invention will be explained as adapted to such use but it is to be understood that the invention may be used for other purposes and that it is not limited to the control of hydraulic apparatus associated with an automotive vehicle.

During operation of an automotive vehicle which is equipped with hydraulically operated earth moving machinery or which draws a hydraulically operated earth moving machine, it often happens that more operations need to be performed substantially simultaneously than the operator has hands and feet with which to perform such operations.

For example, when a tractor equipped with a hydraulically operated earth moving implement is operated over rough terrain in close quarters, it sometimes is necessary to declutch, shift gears, steer the tractor and also to operate a valve to effect withdrawal of the implement from the ground. If the valve is of the ordinary type, the operator must first operate it to effect withdrawal of the implement from the ground and then he must shift the valve to a position to bypass the pump as otherwise the motor would stall at the end of the stroke and then the pump would discharge through its relief valve which would cause waste of power and excessive heating of the motive liquid. It is impossible for an operator to perform all of these operations simultaneously.

The present invention has as an object to provide a valve which will remain in an operative position until pump pressure reaches a predetermined maximum and will then automatically shift to a position in which the pump is bypassed.

Another object is to provide a valve which in response to pump pressure reaching a predetermined maximum will be shifted far enough to start bypassing the pump and will thereafter be shifted by other means into full bypass position.

Other objects and advantages of the invention will appear from the following description of the control valve shown schematically in the accompanying drawings in which the views are as follows:

Fig. 1 is a view showing an embodiment of the invention employed to control a reciprocating hydraulic motor, the plunger of the valve being shown in position to direct liquid from a pump to the upper end of the motor to effect a down stroke thereof and the hydraulic circuit being shown provided with two resistance valves through which liquid is directed to one end or the other of the valve to move its plunger toward neutral in response to pump pressure reaching a predetermined maximum.

Fig. 2 is a view showing the valve with its plunger moving toward neutral position from the position shown in Fig. 1.

Fig. 3 is a view showing the valve with its plunger in neutral position.

Fig. 4 is a view showing the valve with its plunger in position to direct liquid from the pump to the lower end of the motor to effect an upstroke thereof.

Fig. 5 is a view showing the valve with its plunger moving from the position shown in Fig. 4 toward the neutral position shown in Fig. 3.

Figure 8:
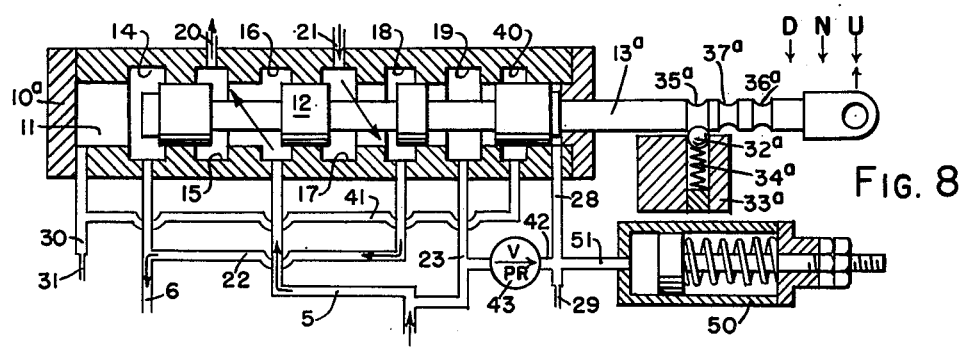
Fig. 8 is a view showing the valve of Fig. 6 with its plunger in position to direct liquid to the lower end of the motor and also showing hydraulic means for completing the movement of the plunger into neutral position instead of the mechanical means shown in Figs. 1–7 for that purpose.

For the purpose of illustration, the invention has been shown as being employed to control the flow of liquid from a pump 1 to a hydraulic motor having a piston 2 fitted in a cylinder 3 and provided with a piston rod 4 for connection to the load. Motor 2—3 has been shown arranged in a vertical position but it may be arranged in any desired position with its rod 4 connected through suitable leakage to the earth moving implement which is to be raised and lowered.

In earth moving machinery carried by or connected to automotive vehicles, ordinarily the pump draws its entire supply of liquid from a tank and the control valve is mounted upon a wall of the tank with its exhaust ports opening directly into the tank so that, if the valve were suddenly shifted completely into its down stroke position, the implement would drop by gravity. In order to effect a down stroke at a controlled rate, it is necessary to so adjust the valve that the flow of liquid therethrough is throttled.

The valve of the present invention may be connected in the same manner and the down stroke of the motor controlled by adjusting the valve to throttle the flow therethrough at which time pump 1 would discharge some liquid through its relief valve. Since a relief valve ordinarily is arranged inside of and forms a part of every pump, the relief valve of pump 1 has not been illustrated in the drawings.

It is desirable that the operator be able to quickly shift the valve to an operative position and then release it. In order that the implement may not drop by gravity when the valve is suddenly shifted to its down stroke position, pump 1 has been shown in Fig. 1 as discharging into a channel 5 and as having liquid returned to it through a channel 6 which also communicates through a resistance valve 7 and a check valve 8 with the interior of a tank 9 containing a supply of liquid.

The arrangement is such that, when piston 2 is moved downward, the liquid expelled by it from cylinder 3 in excess of the liquid required to supply pump 1 is exhausted through resistance valve 7 which offers sufficient resistance to prevent piston 2 from being moved downward by its load and, when piston 2 is moved upward, pump 1 draws a part of its supply of liquid through check valve 8 from reservoir 9.

*Figs. 1–5*

The valve shown in these figures includes a valve body 10, which has an axial bore 11 formed therein, and a valve member or plunger 12 which is closely fitted in bore 11 and is provided with a stem 13 which extends through the end of body 10 for connection either directly or through suitable linkage to a hand lever (not shown) by means of which plunger 12 may be shifted from one to another of its positions.

Plunger 12 controls communication between six annular grooves or ports 14, 15, 16, 17, 18 and 19 which are formed in the wall of bore 11. Port 14 has return channel 6 connected thereto. Port 15 is connected to the lower end of cylinder 3 by a channel 20. Port 16 has supply channel 5 connected thereto. Port 17 is connected to the upper end of cylinder 3 by a channel 21. Port 18 is connected to return channel 6 by a channel 22. Port 19 is connected to supply channel 5 by a channel 23.

In order that plunger 12 may be moved toward its neutral position from either of its two operative positions in response to pump pressure reaching a predetermined maximum, channel 20 is connected to the right end of bore 11 by a channel 24 having connected therein a resistance valve 25 which opens at a pressure higher than the pressure required to raise piston 2, channel 21 is connected to the left end of bore 11 by a channel 26 having connected therein a resistance valve 27 which opens at a pressure higher than the pressure required to force piston 2 downward, the right end of bore 11 is connected to tank 9 by a channel 28 having a choke 29 arranged therein, and the left end of bore 11 is connected to tank 9 by a channel 30 having a choke 31 arranged therein.

Valve plunger 12 preferably is yieldingly retained in each of its three positions by spring detent means which may be associated with any part which is connected to plunger 12. As shown, a detent 32 is fitted in a stationary guide 33 and is urged outward by a spring 34. Detent 32 is adapted to enter any one of three notches 35, 36 and 37 which are formed in stem 13 and correspond, respectively, to the upstroke, downstroke and neutral positions of plunger 12. Notches 35 and 36 may be quite shallow but notch 37 should be large enough to enable spring 34 to move plunger 12 a limited distance by forcing detent 32 into notch 37.

*Operation*

When the operator shifts valve plunger 12 to the position shown in Fig. 1, the liquid discharged by pump 1 will flow through channel 5, ports 16 and 17 and channel 21 to the upper end of cylinder 3 and will move piston 2 downward. Piston 2 will eject liquid from the lower end of cylinder 3 through channel 20 and ports 15 and 14 into return channel 6. Due to the displacement of rod 4, the volume of liquid discharged from the lower end of cylinder 3 is greater than the volume supplied to the upper end of cylinder 3 by pump 1. Therefore, enough liquid to supply pump 1 will flow thereto through channel 6 and the remainder of the liquid ejected from cylinder 3 will be exhausted into tank 9 through resistance valve 7 which may be adjusted to offer enough resistance to the discharge of liquid from cylinder 3 to prevent piston 2 from being moved downward solely by gravity.

When the implement has been lowered to the desired point, the operator may shift plunger 12 to its neutral position or the linkage connecting rod 4 to the implement may be so constructed and adjusted that either piston 2 will stall against the end of cylinder 3 or a stop on the linkage will engage a stationary abutment in either of which cases piston 2 will stop which will cause pressure to rise high enough to open resistance valve 27 and then liquid will flow therethrough and through channel 26 to the left end of bore 11. The liquid will try to flow through channel 30 but only a small part of the liquid can flow therethrough due to choke 31. Therefore, pressure will rise in the left end of bore 11 and cause plunger 12 to move toward the right and to eject liquid from the right end of bore 11 through channel 28 and choke 29.

After plunger 12 has moved part way toward its neutral position, it starts to uncover port 19 and a slight additional movement of plunger 12 opens port 19 wide enough, as indicated in Fig. 2, to permit the liquid discharged by pump 1 to flow through channels 5 and 23, ports 19 and 18 and channels 22 and 6 back to the intake of the pump, thereby causing pump pressure to drop and resistance valve 27 to close so that no more liquid will enter the left end of bore 11 to move plunger 12 farther toward the right.

At this time however, detent 32 has started to enter notch 37 so that spring 34 can then force detent 32 into notch 37 and thereby cause it to move plunger 12 into its neutral position as shown in Fig. 3. With plunger 12 in its neutral position, ports 13 and 19 are fully open so that pump 1 can bypass liquid therethrough at substantially zero pressure.

When the operator shifts plunger 12 into its upstroke position as indicated in Fig. 4, the liquid discharged by pump 1 will flow through channel 5, ports 16 and 15 and channel 20 to the lower end of cylinder 3 and will move piston 2 upward. Piston 2 will eject liquid from the upper end of cylinder 3 through channel 21, ports 17 and 18 and channels 22 and 6 to the intake of pump 1. Due to the displacement of rod 4, the volume of liquid discharged from the upper end of cylinder 3 is less than the volume supplied to the lower end of cylinder 3 by pump 1 but enough additional liquid to make up its requirements is drawn by pump 1 from tank 9 through check valve 8.

Piston 2 will move upward until it stalls and thereby cause pressure to rise high enough to open resistance valve 25 and then liquid will flow therethrough and through channel 24 to the right end of bore 11. The liquid will try to flow through channel 28 but only a small part of the liquid can flow therethrough due to choke 29. Therefore, pressure will rise in the right end of bore 11 and cause plunger 12 to move toward the left and to eject liquid from the left end of bore 11 through channel 30 and choke 31.

After plunger 12 has moved part way toward its neutral position, it starts to uncover port 18 and a slight additional movement of plunger 12 opens port 18 wide enough, as indicated in Fig. 5, to permit the liquid discharged by pump 1 to flow through channels 5 and 23, ports 19 and 18 and channels 22 and 6 back to the intake of pump 1, thereby causing pump pressure to drop and resistance valve 25 to close so that no more liquid will enter the right end of bore 11 to move plunger 12 farther toward the left.

At this time however, detent 32 has started to enter notch 37 and it will move plunger 12 into its neutral position to thereby bypass pump 1 at substantially zero pressure as previously explained.

Figs. 6 and 7

The valve and the hydraulic circuit shown in these figures differs from the valve and the circuit shown in Fig. 1 in that its plunger is adapted to be moved toward neutral from either of its two operative positions by liquid breaking through a single resistance valve instead of by liquid breaking through one or the other of the two resistance valves 25 and 27.

As shown, the valve includes a valve body 10$^a$ which is the same as valve body 10 except that it has an annular groove or port 40 formed in the wall of bore 11 near to but spaced from the right end of bore 11 and no connections for channels 24 and 26 are provided. Port 40 is connected to the left end of bore 11 as by means of a channel 41 which connects it to channel 30 at a point between bore 11 and choke 31. Pump 1 is connected through a suitable resistance valve to the right end of bore 11 such as by connecting channel 28 at a point between bore 11 and choke 29 to channel 23 by a channel 42 having connected therein a resistance valve 43 which opens at a pressure higher than the pressure required to operate motor 2—3 in either direction.

Since the valve and the hydraulic circuit associated therewith are otherwise the same as the valve and the circuit shown in Fig. 1, like parts have been indicated by like reference numerals so that further description thereof is deemed unnecessary.

Figure 6:
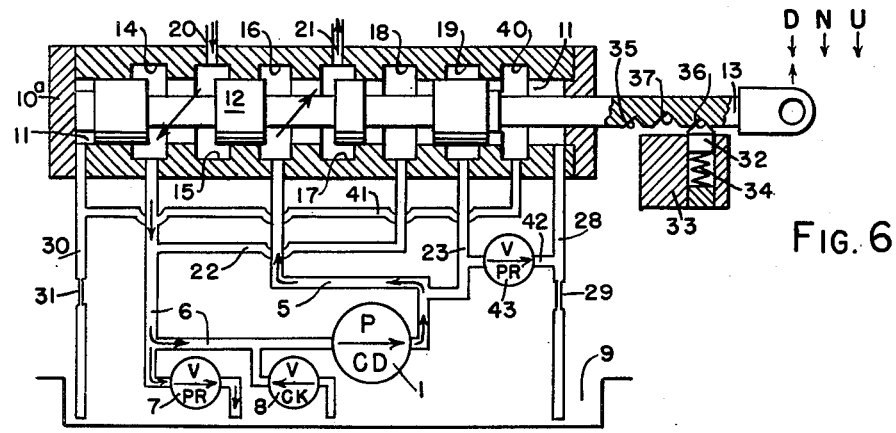
Fig. 6 is a view similar to Fig. 1 but showing an arrangement whereby only one resistance valve is required to cause the valve plunger to move toward neutral in response to pump pressure reaching a predetermined maximum, the plunger being shown in position to direct liquid to the upper end of the motor.

The arrangement is such that, with valve plunger 12 in the position shown in Fig. 6, liquid from pump 1 will flow through channel 5, ports 16 and 17 and channel 21 to the upper end of cylinder 3 and move piston 2 downward until pump pressure becomes high enough to open resistance valve 43. Then liquid will flow through resistance valve 43, channels 42 and 28, the right end of bore 11, port 40 and channels 41 and 30 to the left end of bore 11. Due to the displacement of stem 13, plunger 12 will be moved toward the right by the pressure exerted upon its left end.

Figure 7:
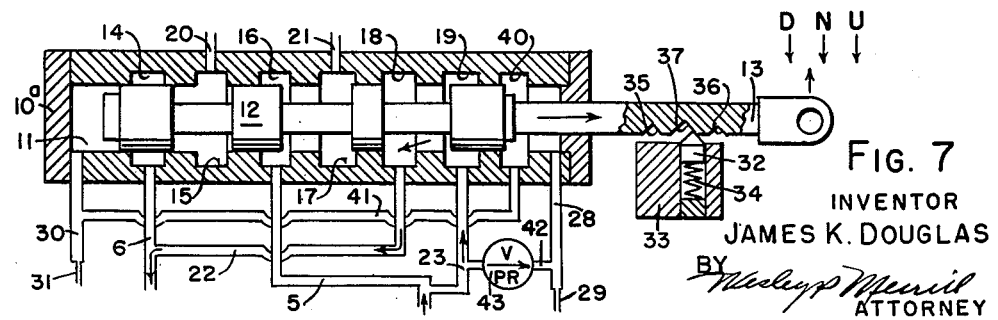
Fig. 7 is a view showing the valve of Fig. 6 with its plunger moving toward neutral from the position shown in Fig. 6.

Before plunger 12 reaches its neutral position, plunger 12 starts to uncover port 19 (as shown in Fig. 7) which permits the liquid from pump 1 to flow through channels 5 and 23, ports 19 and 18 and channels 22 and 6 back to the pump, thereby causing pump pressure to drop and valve 43 to close so that there is no more liquid to move plunger 12 farther toward the right but in that position of the plunger 12 detent 32 has entered notch 37 and plunger 12 will be moved into its neutral position by spring 34 forcing detent 32 farther into notch 37.

When plunger 12 is in its right hand position as indicated in Fig. 8, liquid from pump 1 will flow through channel 5, ports 16 and 15 and channel 20 to the lower end of cylinder 3 and move piston 2 upward until pump pressure becomes high enough to open resistance valve 43. Then liquid will flow through resistance valve 43 and channels 42 and 28 to the right end of bore 11 and move plunger 12 toward the left.

Figure 9:
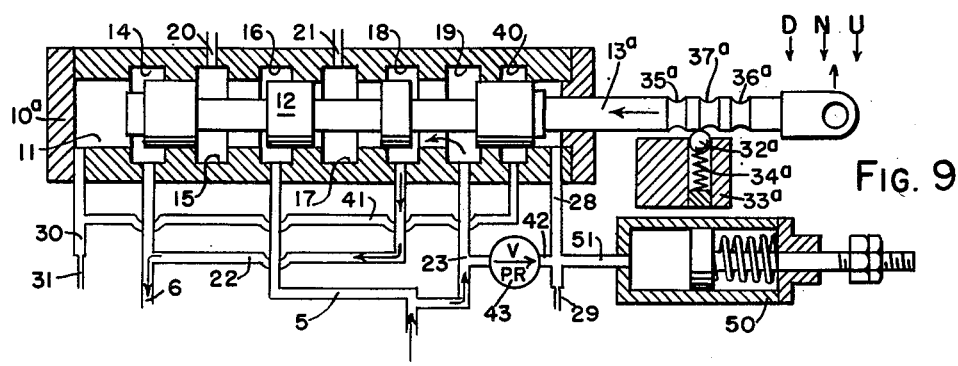
Fig. 9 is a view similar to Fig. 8 but showing the valve plunger moving toward neutral from the position shown in Fig. 8.

Before plunger 12 reaches its neutral position, it starts to uncover port 18 (as indicated in Fig. 9) which bypasses the pump and causes resistance valve 43 to close but at this time detent 32 has entered notch 37 and it will move plunger 12 into neutral as explained above.

Figs. 8 and 9

If the valve plunger is large and heavy, a detent mechanism strong enough to move it into its neutral position might be so large that it would require more space than was available and it would hold the plunger so firmly in neutral that the operator would have to exert considerable force to move the plunger out of neutral. However, the valve plunger may be moved hydraulically into its neutral position by providing a small accumulator which is charged when pump pressure reaches the predetermined maximum and which supplies liquid for moving the plunger into neutral position after the plunger has moved far enough from either of its operative positions to bypass the pump.

As shown in Figs. 8 and 9, a small accumulator 50 is connected to the right end of bore 11 as by being connected by a channel 51 to channel 28 at a point between bore 11 and choke 29. With such an accumulator in the circuit, detent means is unnecessary but it is desirable that means be provided to prevent the valve plunger from being accidentally displaced from an adjusted position. As shown, a small detent 32$^a$ is arranged in a stationary guide 33$^a$ and is adapted to be urged by a spring 34$^a$ into any one of three notches 35$^a$, 36$^a$ and 37$^a$ which are formed in the stem 13$^a$ of plunger 12 and correspond, respectively, to the upstroke, downstroke and neutral positions of plunger 12. Since the valve and the hydraulic circuit shown in Figs. 8 and 9 is otherwise substantially the same as the valve and the circuit shown in Figs. 6 and 7, like parts have been indicated by like reference numerals so that further description thereof is unnecessary.

The arrangement is such that, with valve plunger 12 in the position shown in Fig. 8, liquid from pump 1 will flow through channel 5, ports 16 and 15 and channel 20 to the lower end of cylinder 3 and will move piston 2 upward until pump pressure becomes high enough to open resistance valve 43 and then liquid will flow therethrough and through channel 42 into channel 28. Since the force required to start plunger 12 moving is greater than the force required to keep it moving after it has been started, the liquid will first flow through channel 51 and charge accumulator 50 and then it will flow through channel 28 to the right end of bore 11 and will move plunger 12 toward the left.

Before plunger 12 reaches its neutral position, it starts to uncover port 18 (as shown in Fig. 9) so that pump 1 is bypassed, pump pressure drops and valve 43 closes. Then liquid will flow from accumulator 50 through channels 51 and 28 into the right end of bore 11 and will move plunger 12 into its neutral position.

Accumulator 50 may be adjusted to contain just enough liquid to move plunger 12 into its dead center position in addition to the liquid exhausted through choke 29 but, if the volume of liquid in accumulator 50 is such that it tends to move plunger 12 beyond dead center, plunger 12 cannot move beyond the range of its neutral position for the reason that a slight movement beyond dead center uncovers port 40 and then pressure will extend therethrough and through channels 41 and 30 to the left end of bore 11 and act upon the left end of piston 12 which has an effective area greater than the effective area of the right end of plunger 12 so that movement of plunger 12 is stopped. Thereafter, any liquid remaining in accumulator 50 is exhausted through chokes 29 and 31.

When plunger 12 is in its downstroke position as shown in Fig. 6, liquid from pump 1 will move motor piston 2 downward until pump pressure becomes high enough to open resistance valve 43 and then liquid will flow therethrough and through channels 42 and 28, the right end of bore 11, port 40 and channels 41 and 30 to the left end of bore 11 and move plunger 12 toward the right to the position shown in Fig. 7 as previously explained. Then the liquid in accumulator 50 will move plunger 12 into its neutral position but it cannot move plunger 12 beyond neutral for the reason that as soon as plunger 12 moves beyond its dead center position it uncovers port 14 so that any liquid remaining in accumulator 50 is exhausted into return channel 6.

The invention herein set forth may be modified in various other ways and adapted to various uses without departing from the scope of the invention which is hereby claimed as follows.

I claim:

1. In a hydraulic circuit including a hydraulic device and a pump for supplying liquid to said device to operate the same, the combination of a valve body connected into said circuit between said pump and said device and having a bore formed therein, a valve plunger fitted in said bore and shiftable to different positions to control the flow of liquid from said pump to said device, means for connecting said pump to an end of said bore including a resistance valve adapted to open at a predetermined maximum pressure and permit liquid to flow from said pump to an end of said bore and move said plunger from a first position part way toward a second position, means effective after said plunger has been moved part way toward said second position for moving it into said second position, and means for permitting liquid to escape at a limited rate from each end of said bore.

2. In a hydraulic circuit including a hydraulic device and a pump for supplying liquid to said device to operate the same, the combination of a valve body connected into said circuit between said pump and said device and having a bore formed therein, a valve plunger fitted in said bore and shiftable to different positions to control the flow of liquid from said pump to said device, means for connecting said pump to an end of said bore including a resistance valve adapted to open at a predetermined maximum pressure and permit liquid to flow from said pump to an end of said bore and move said plunger from a first position part way toward a second position, other hydraulic means effective only after said plunger has been moved part way toward said second position for moving it into said second position, and means for permitting liquid to escape at a limited rate from each end of said bore.

3. A combination according to claim 2 in which said hydraulic means includes an accumulator connected to the outlet of said resistance valve and to said end of said bore.

4. In a hydraulic circuit including a hydraulic device and a pump for supplying liquid to said device to operate the same, the combination of a valve body connected into said circuit between said pump and said device and having a bore formed therein, a valve plunger fitted in said bore and shiftable to different positions to control the flow of liquid from said pump to said device, means for connecting said pump to an end of said bore including a resistance valve adapted to open at a predetermined maximum pressure and permit liquid to flow from said pump to an end of said bore and move said plunger from a first position part way toward a second position, mechanical means effective after said plunger has been moved part way toward said second position for moving it into said second position, and means for permitting liquid to escape at a limited rate from each end of said bore.

5. In a hydraulic circuit including a hydraulic device and a pump for supplying liquid to said device to operate the same, the combination of a valve body connected into said circuit between said pump and said device and having a bore formed therein, a valve plunger fitted in said bore and shiftable to different positions to control the flow of liquid from said pump to said device, means for connecting said pump to an end of said bore including a resistance valve adapted to open at a predetermined maximum pressure and permit liquid to flow from said pump to an end of said bore and move said plunger from a first position part way toward a second position, means for permitting liquid to escape at a limited rate from each end of said bore, manual means for shifting said plunger, and spring detent means associated with said manual means for holding said plunger in adjusted postion and for moving said plunger into said second position after said plunger reaches a given point between said two positions.

6. In a hydraulic circuit including a hydraulic device and a pump for supplying liquid to said device to operate the same, the combination of a valve body connected into said circuit and provided with pump and exhaust ports for the flow of liquid from and to said pump and two distributing ports for the flow of liquid to and from said device, said body having formed therein a bore which communicates with all of said ports, a valve plunger fitted in said bore to control communication between said ports and adapted to occupy either a neutral position in which a pump port communicates with an exhaust port to bypass said pump or one or the other of two operative positions in each of which a pump port communicates with one or the other of said distributing ports to effect operation of said device in one direction or the other, means for connecting said pump to an end of said bore including a resistance valve adapted to open at a predetermined maximum pressure and permit liquid to flow from said pump to an end of said bore and move said plunger from an operative position toward its neutral position to a point at which a pump port starts to communicate with an exhaust port, means for permitting liquid to escape at a limited rate from each end of said bore, and other means operable after said plunger reaches said point for moving said plunger into its neutral position.

7. A combination according to claim 6 in which the said connecting means includes a first resistance valve having its outlet connected to one end of said bore and its inlet connected to one of said distributing ports and a second resistance valve having its outlet connected to the other end of said bore and its inlet connected to the other of said distributing ports, each of said resistance valves being adapted to open at a predetermined maximum pressure and permit liquid to flow from said pump to one or both ends of said bore and move said plunger from one or the other of said two operative positions toward said neutral position.

8. A combination according to claim 6 in which said valve plunger is provided with manual means for shifting it, and said other means includes spring detent means associated with said manual means for retaining said plunger in adjusted position and for moving it from said point into its neutral position.

9. A combination according to claim 6 in which the said connecting means includes a first resistance valve having its outlet connected to one end of said bore and its inlet connected to one of said distributing ports and a second resistance valve having its outlet connected to the other end of said bore and its inlet connected to the other of said distributing ports, said valve plunger is provided with manual means for shifting it, and said other means includes spring detent means associated with said manual means for retaining said plunger in adjusted position and for moving it from said point into its neutral position.

10. A combination according to claim 6 in which the said connecting means includes a resistance valve having its outlet connected to one end of said bore and its inlet arranged to be subjected to the pressure created by said pump so that an increase in pump pressure above a predetermined value will cause said resistance valve to open and liquid to flow to said one end of said bore and move said plunger toward its neutral position, and said other means including an accumulator connected to said one end of said bore and charged with liquid in response to said resistance valve opening.

11. In a hydraulic circuit including a hydraulic device and a pump for supplying liquid to said device to operate the same, the combination of a valve body connected into said circuit between said pump and said device and having a bore formed therein, a valve plunger fitted in said bore and adapted to occupy a neutral position in which it causes said pump to be bypassed or one or the other of two operative positions in which it causes liquid from said pump to operate said device in one direction or the other said valve body having a port formed therein adjacent to but spaced from one end of said bore and adapted to be closed by said plunger when said plunger is in one of its operative positions, channel means connecting said port to the other end of said bore, a valve stem fixed to said plunger and extending outward through said body at said one end of said bore, means responsive to pump pressure rising above a predetermined value for directing liquid from said pump to said one end of said bore to cause said plunger to move from either one of its two operative positions toward its neutral position to a point at which said pump starts to be bypassed, and other means effective after said plunger reaches said point for moving said plunger into its neutral position.

12. In a hydraulic circuit including a hydraulic device and a pump for supplying liquid to said device to operate the same, the combination of a valve body connected into said circuit between said pump and said device and having a bore formed therein, a valve plunger fitted in said bore and adapted to occupy a neutral position in which it causes said pump to be bypassed or one or the other of two operative positions in which it causes liquid from said pump to operate said device in one direction or the other, said valve body having a port formed therein adjacent to but spaced from one end of said bore and adapted to be closed by said plunger when said plunger is in one of its operative positions, channel means connecting said port to the other end of said bore, manual means for moving said plunger including a valve stem fixed to said plunger and extending outward through said body at said one end of said bore, means responsive to pump pressure rising above a predetermined value for directing liquid from said pump to said one end of said bore to cause said plunger to move from either one of its two operative positions toward its neutral position to a point at which said pump starts to be bypassed, and spring detent means associated with said manual means for holding said plunger in adjusted position and for moving said plunger from said point into its neutral position.

13. In a hydraulic circuit including a hydraulic device and a pump for supplying liquid to said device to operate the same, the combination of a valve body connected into said circuit between said pump and said device and having a bore formed therein, a valve plunger fitted in said bore and adapted to occupy a neutral position in which it causes said pump to be bypassed or one or the other of two operative positions in which it causes liquid from said pump to operate said device in one direction or the other, said valve body having a port formed therein adjacent to but spaced from one end of said bore and adapted to be closed by said plunger when said plunger is in one of its operative positions, channel means connecting said port to the other end of said bore, a valve stem fixed to said plunger and extending outward through said body at said one end of said bore, a resistance valve connected between said pump and said one end of said bore and adapted in response to pump pressure rising above a predetermined value to open and permit liquid from said pump to flow therethrough to said one end of said bore and cause said plunger to move from either one of its two operative positions toward its neutral position to a point at which said pump starts to be bypassed, and other means effective after said plunger reaches said point for moving said plunger into its neutral position.

14. In a hydraulic circuit including a hydraulic device and a pump for supplying liquid to said device to operate the same, the combination of a valve body connected into said circuit between said pump and said device and having a bore formed therein, a valve plunger fitted in said bore and adapted to occupy a neutral position in which it causes said pump to be bypassed or one or the other of two operative positions in which it causes liquid from said pump to operate said device in one direction or the other, said valve body having a port formed therein adjacent to but spaced from one end of said bore and adapted to be closed by said plunger when said plunger is in one of its operative positions, channel means connecting said port to the other end of said bore, a valve stem fixed to said plunger and extending outward through said body at said one end of said bore, a resistance valve connected between said pump and said one end of said bore and adapted in response to pump pressure rising above a predetermined value to open and permit liquid from said pump to flow therethrough to said one end of said bore and cause said plunger to move from either one of its two operative positions toward its neutral position to a point at which said pump starts to be bypassed, and an accumulator connected to said one end of said bore and adapted in response to said resistance valve being opened to be charged with liquid which after said plunger reaches said point flows to said one end of said bore and moves said plunger from said point into its neutral position.

JAMES K. DOUGLAS.

REFERENCES CITED

The following references are of record in the file of this patent:

UNITED STATES PATENTS

| Number | Name | Date |
|---|---|---|
| 1,952,690 | Strom, Sr. | Mar. 27, 1934 |
| 1,968,422 | Proctor et al. | July 31, 1934 |
| 2,184,793 | Clench | Dec. 26, 1939 |
| 2,243,364 | Trautman | May 27, 1941 |
| 2,298,457 | Berges | Oct. 13, 1942 |
| 2,302,232 | MacNeil | Nov. 17, 1942 |
| 2,307,544 | Robinson | Jan. 5, 1943 |
| 2,363,235 | Ellingwood | Nov. 21, 1944 |